J. FESENMAIER.
BEARING FOR POTATO WASHERS.
APPLICATION FILED MAR. 27, 1913.
1,164,799.
Patented Dec. 21, 1915.
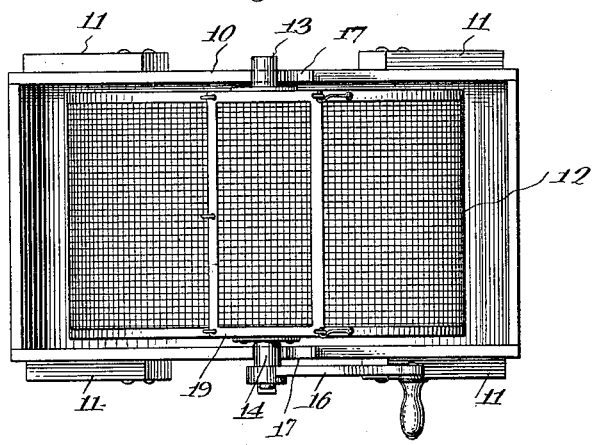
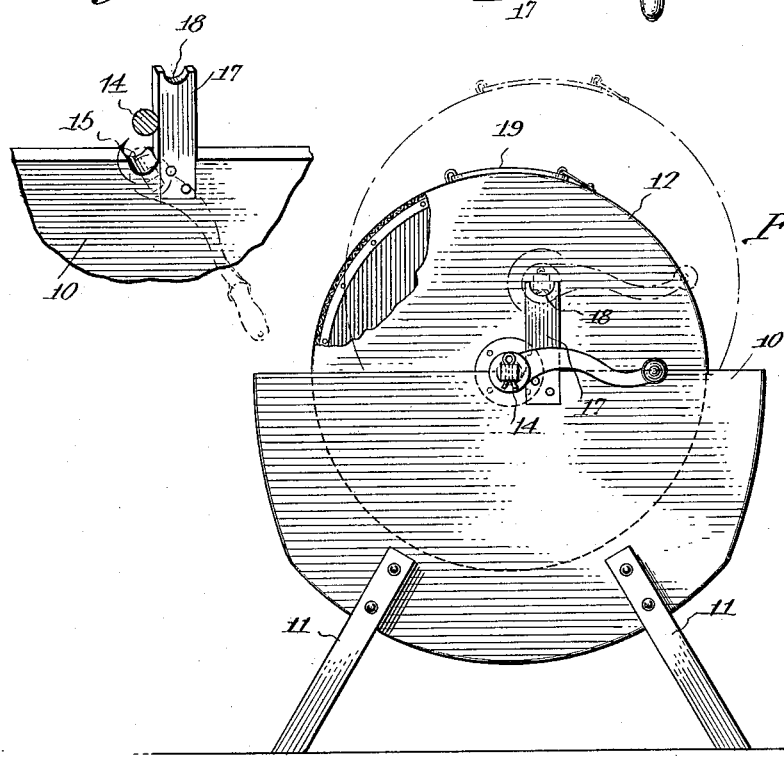
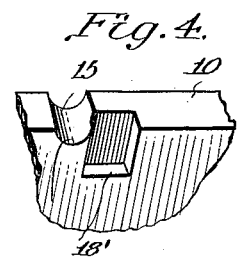
WITNESSES
INVENTOR
Joseph Fesenmaier
By E. C. Vrooman his Attorney.

UNITED STATES PATENT OFFICE.

JOSEPH FESENMAIER, OF NEW ULM, MINNESOTA.

BEARING FOR POTATO-WASHERS.

1,164,799.   Specification of Letters Patent.   Patented Dec. 21, 1915.

Application filed March 27, 1913. Serial No. 757,213.

*To all whom it may concern:*

Be it known that I, JOSEPH FESENMAIER, citizen of the United States, residing at New Ulm, in the county of Brown and State of Minnesota, have invented certain new and useful Improvements in Bearings for Potato-Washers, of which the following is a specification, reference being had therein to the accompanying drawing.

This invention relates to a machine which is intended to be used for washing potatoes and other similar vegetables which grow beneath the ground and, therefore, need to be washed before they are prepared for cooking.

One of the objects of the invention is to so construct the washing machine that the stub axles upon which the drum is mounted will be prevented from working out of place.

Another object of the invention is to so construct the tub that the standards which hold the drum in a raised position will form abutments for holding the stub axles in their normal position.

With these and other objects in view this invention consists of certain novel combinations, constructions, and arrangements of parts as will be hereinafter fully described and claimed.

In the accompanying drawing:—Figure 1 is a top plan view of the washing machine. Fig. 2 is a side elevation of the machine with one portion of the drum broken away. Fig. 3 is a fragmentary perspective view showing the manner in which the standard holds the stub axle in place. Fig. 4 is a fragmentary perspective view of that portion of the tubbing shown in Fig. 3 with the standard removed.

This invention comprises a tub 10 supported upon the supporting legs 11 and open at its upper end to permit the drum 12 to rotate freely. This drum is circular and has its side disks connected by a wire fabric, thus permitting the water in the tub 10 to pass into the lower portion of the drum when the drum is in the position shown in Figs. 1 and 2. Stub axles 13 and 14 extend from the drum and fit into sockets 15 formed in the upper edge of the tub, thus pivotally mounting the drum and permitting it to rotate freely. A handle 16 is connected with the stub axle 14 to permit the drum to be rotated. Standards 17 are mounted in the pockets 18' formed adjacent the sockets 15 and form abutments preventing the drum from jumping out of place. From an inspection of Fig. 3 it will be readily seen that when the handle is pushed downward from the position shown in Fig. 2 that the downward pressure will hold the axles in place, and that upon the up stroke the stub axles will strike the standards 17 and fall back into the sockets 15 in case the drum is turned with sufficient speed to cause the stub axles to leave the sockets. Sockets 18 are formed in the upper ends of the standards 17, thus permitting the drum to be raised and the stub axles rested in the sockets to permit the water to drain from the potatoes in the drum. After the drum is in the position shown in Figs. 1 and 2 the potatoes are placed in the drum through the door 19 and the tub is then partially filled with water. By turning the handle the potatoes are caused to roll in the drum, thus rubbing against each other and scraping the dirt off. When the drum has been turned a sufficient length of time to thoroughly cleanse the potatoes the drum is raised and rested upon the standards and allowed to remain in this position until the water has drained out. By this construction it is not necessary to have cover plates for the slots 15, thereby permitting the drum to be easily and quickly raised without it being necessary to stop to unfasten cover plates. Upon the downward stroke of the handle the pressure keeps the stub axles in position in the sockets 15 and upon the up stroke the turning of the drum toward the standards 17 would throw the drum toward the standards in case it was turning with sufficient speed to jump, thereby causing the stub axles to strike the standards and drop back into the sockets. In case the stub axles struck the bearings with sufficient force to be thrown back beyond the bearings the direction in which the tub turns would cause the stub axles to roll along the upper edges of the tub and back into the bearings. A machine has, therefore, been provided which can be easily and quickly operated.

Having thus described the invention what is claimed as new, is:—

In a device of the class described, the combination of a supporting body, said body provided at opposite sides with registering semi-circular shaft-receiving sockets formed in its upper edges, said body being provided with squared pockets formed only in the outer faces of said body and at the upper edges contiguous to the semi-circular sockets, vertical standards being seated at the lower ends entirely within said pockets, said standards projecting a considerable distance above the upper edges of said body, a shaft positioned within said sockets and being adapted to rotate freely, said shaft being adapted to strike against said standards when rotating in a clock-wise direction, whereby said shaft may be prevented from moving entirely out of said sockets, said shaft also being adapted to be rotated in a counter-clock-wise direction, whereby the same may be rolled from said pockets and away from said standards, means for retaining said standards within said pockets, said standards being flush with the outer faces of said body whereby said pockets will retain said standards for reducing the strain upon said means.

In testimony whereof I hereunto affix my signature in presence of two witnesses.

JOSEPH FESENMAIER.

Witnesses:
HERTHA WEDDENDORF,
WILLIAM H. DEMPSEY.

Copies of this patent may be obtained for five cents each, by addressing the "Commissioner of Patents, Washington, D. C."